Sept. 5, 1933.　　　T. W. MORRIS　　　1,925,084
SHEARING APPARATUS
Filed Oct. 31, 1931
*Fig. 1*
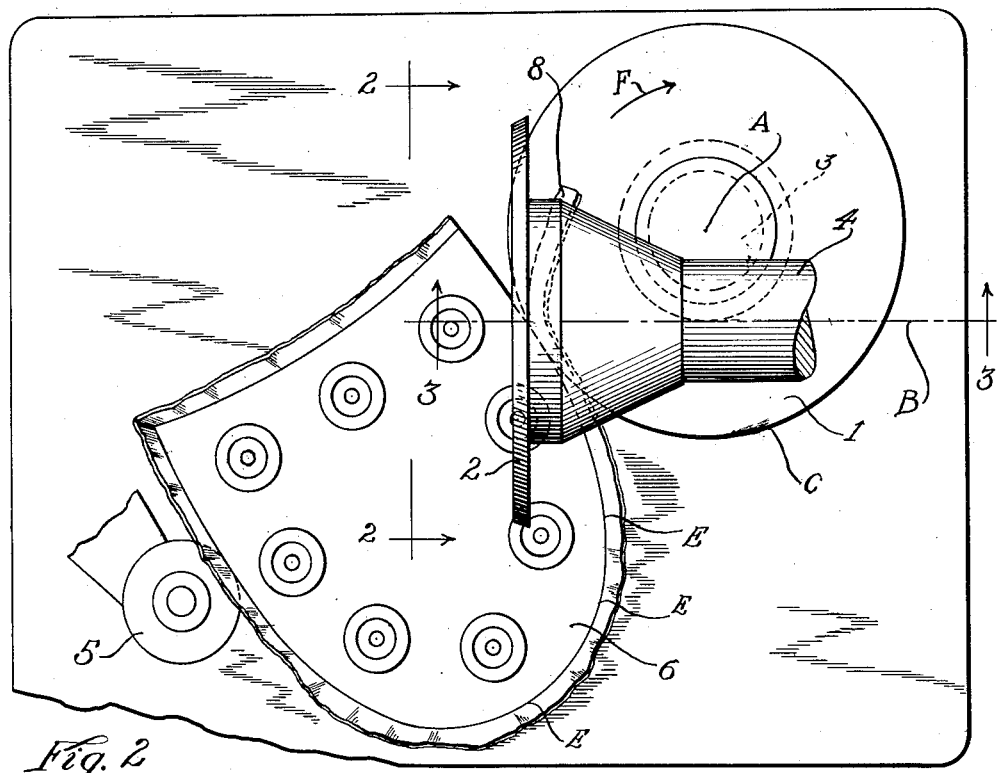
*Fig. 2*
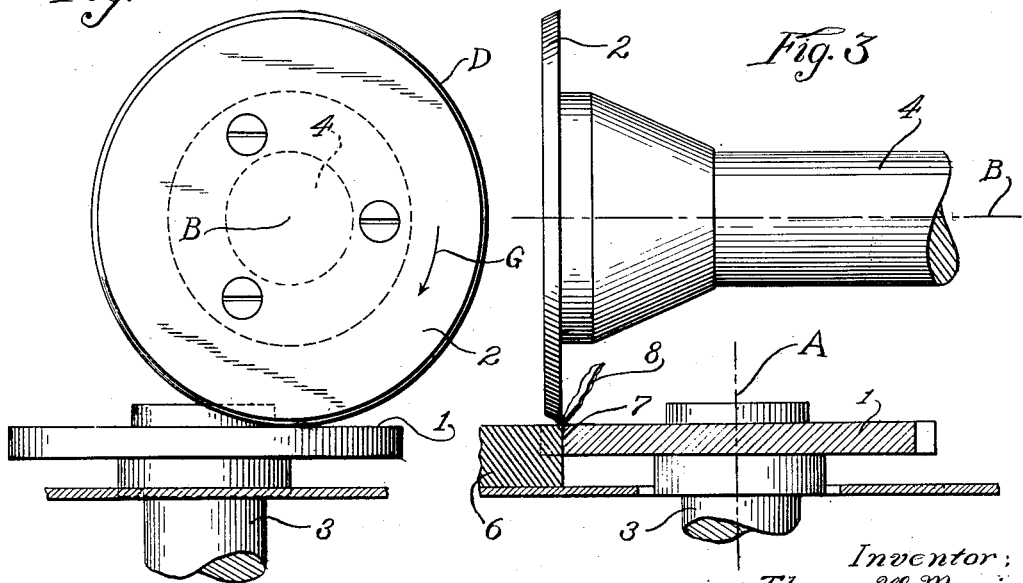
*Fig. 3*
Inventor:
Thomas W. Morris,
By Jones, Addington, Ames & Seibold
Attys Patented Sept. 5, 1933

1,925,084

UNITED STATES PATENT OFFICE 1,925,084

SHEARING APPARATUS

Thomas W. Morris, Chicago, Ill.

Application October 31, 1931. Serial No. 572,253

2 Claims. (Cl. 164—61)

My invention relates to shearing apparatus.

In my patent, No. 1,361,531, dated December 7, 1920, is disclosed a rotary shearing apparatus which has been found satisfactory for shearing a laterally-extending overflow rind from a molded rubber article.

One of the objects of my invention is to provide improved rotary shearing apparatus for shearing a non-laterally extending overflow rind from a molded rubber article.

In the drawing, in which an embodiment of my improved apparatus is shown,

Figure 1 is a plan view showing the two circular shearing cutters operating on the upwardly-extending overflow rind of a molded rubber heel;

Fig. 2 is a view on the line 2—2 of Fig. 1; and

Fig. 3 is a view on the line 3—3 of Fig. 1.

Referring to the drawing in detail, the construction shown comprises a pair of rotary cutters—1 and 2, one secured to rotate with a vertical shaft—3, and the other secured to rotate with a horizontal shaft—4, a table support for the article to be trimmed and a spring pressed roller means —5, for guiding the article as it is being trimmed, and for holding it in proper relation with respect to the rotary cutters. The rotary cutters 1 and 2, have non-intersecting axes A and B, respectively. Each cutter has a circular cutting edge, the cutting edges C and D engaging each other and lying in different non-parallel planes. The intersection of the planes of the two cutters forms a chord of the circular cutting edge C of the horizontal cutter (as shown in Fig. 1) and a tangent to the circular cutting edge D of the vertical cutter (as shown in Fig. 2).

The heel 6 is so supported and guided as it is being trimmed that the curved line E on the heel on which it is to be sheared remains substantially in the plane of the circular cutting edge of the horizontal cutter 1. The cutters 1 and 2 are rotated in the direction of the arrows F and G in Figs. 1 and 2, respectively. The guide roller 5 yieldingly presses the edge of the rubber heel 6 against the side edge 7 of the horizontal cutter, as may be seen from Figs. 1 and 3. The frictional engagement of the edge of the heel with the edge 7 of the horizontal cutter feeds the heel forward, causing the upwardly extending overflow rind 8 to be sheared off along a substantially horizontal plane, as may be seen from Figs. 1 and 3.

The motion of the cutting edges of the cutters also exerts a drawing action on the rind and adjacent part of the heel which assists in the feeding operation.

Further modifications will be apparent to those skilled in the art and I desire, therefore, to be limited only by the prior art and the scope of the appended claims.

Having thus described my invention, what I claim and desire to secure by Letters Patent is:

1. Shearing apparatus for shearing a non-laterally extending overflow rind from a molded rubber article, comprising two cooperating rotary cutters having non-intersecting axes, each having a circular cutting edge, said circular cutting edges engaging each other and lying in different non-parallel planes, the intersection of said planes forming a chord of one of said circles and a tangent to the other, and means for so supporting and guiding said article as it is being trimmed that the line on the article on which it is to be sheared remains substantially in the plane of that circle of which said intersection forms a chord.

2. Shearing apparatus for shearing an overflow rind from a molded rubber article, comprising two cooperating rotary cutters having non-intersecting axes, each having a circular cutting edge, said circular cutting edges engaging each other and lying in different non-parallel planes, the intersection of said planes forming a chord of one of said circles and a tangent to the other, and means for so supporting and guiding said article as it is being trimmed that the line on the article on which it is to be sheared remains substantially tangential to that circle of which said intersection forms a chord.

THOMAS W. MORRIS.